United States Patent [19]
Kara

[11] Patent Number: 4,558,386
[45] Date of Patent: Dec. 10, 1985

[54] HEAD CLEANER FOR FLOPPY DISK DRIVE

[75] Inventor: Stephen Kara, Thousand Oaks, Calif.

[73] Assignee: SSK Enterprises, Inc., Westlake Village, Calif.

[21] Appl. No.: 384,908

[22] Filed: Jun. 4, 1982

[51] Int. Cl.⁴ .......................... G11B 5/41; G11B 23/02
[52] U.S. Cl. ..................................... 360/128; 360/86; 360/137; 360/133
[58] Field of Search .................. 360/128, 137, 133, 99, 360/86, 135; 15/210 R

[56] References Cited

U.S. PATENT DOCUMENTS

| 3,951,264 | 4/1976 | Heidecker | 206/444 |
| 4,065,798 | 12/1977 | Sugiaski | 360/128 |
| 4,106,067 | 8/1978 | Masuyama | 360/137 |
| 4,180,840 | 12/1979 | Allan | 360/128 |
| 4,188,650 | 2/1980 | Rein | 360/133 |
| 4,214,286 | 7/1980 | Ragle | 360/99 |
| 4,216,511 | 8/1980 | Bilek | 360/133 |
| 4,251,843 | 2/1981 | Masuyama | 360/137 |
| 4,374,404 | 2/1983 | Davis | 360/128 |
| 4,375,658 | 3/1983 | Martinelli | 360/86 |

OTHER PUBLICATIONS

Quill Office Supplies & Equipment Catalog (1982), p. 81.

Primary Examiner—R. Martin Kilgore
Attorney, Agent, or Firm—Koppel & Harris

[57] ABSTRACT

A head cleaner includes a generally flat, rectangular sheath 10 formed of flexible top and bottom walls 11 and 12 as is standard in floppy disk construction. The magnetic disk that would be within the sheath is replaced by a flat, absorbent member 17 which has an opening 18 such that it can be mounted on the hub of a disk drive. One of the walls of the sheath has an aperture 22 through which head 34 can extend and contact the absorbent member. A liquid solvent is applied in the aperture to the absorbent member to dissolve built up oxides on the head. The aperture is made wider than standard apertures for floppy disks, and there are additional apertures on other edges of the sheath for providing additional windows. Other windows may be through the other wall of the sheath such that there are eight total windows in the head cleaners. Therefore, the head cleaner can be inserted into the disk drive with any edge leading and with either wall on the head side of the drive.

7 Claims, 1 Drawing Figure

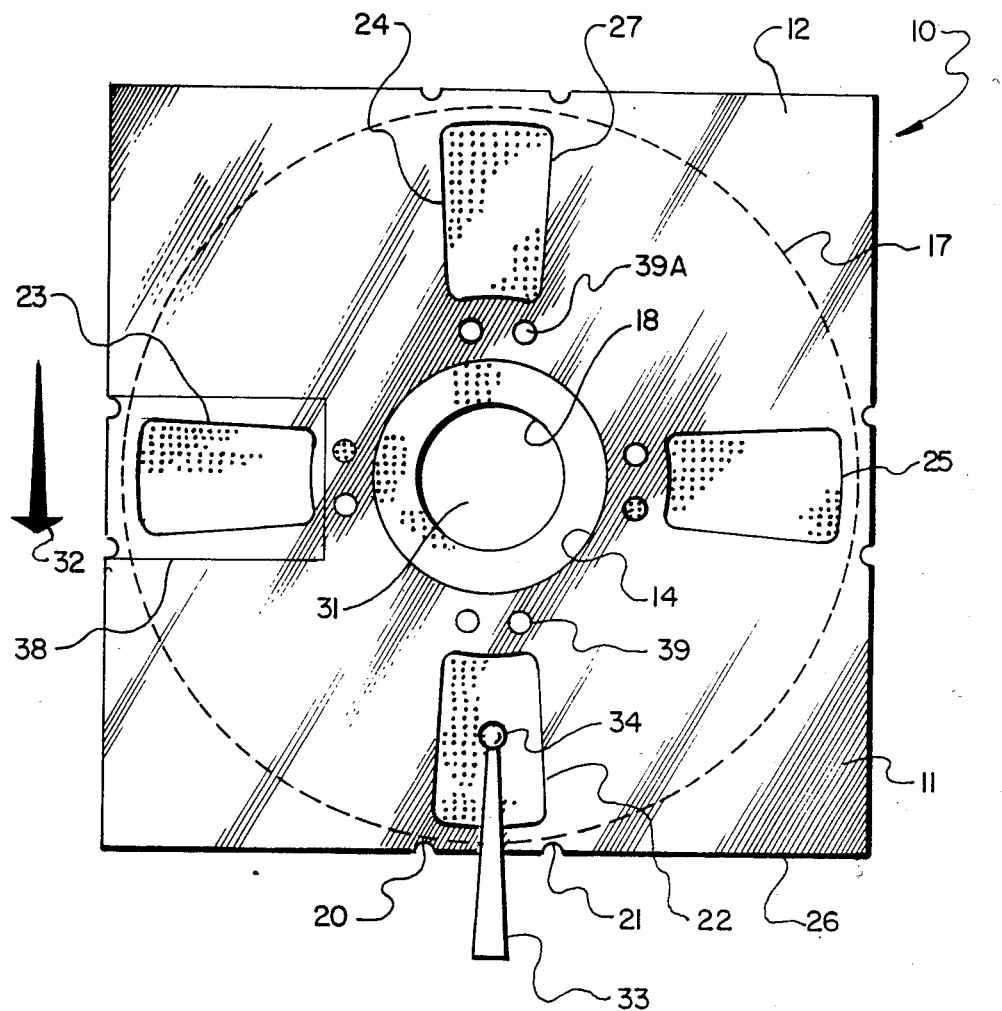

HEAD CLEANER FOR FLOPPY DISK DRIVE

BACKGROUND OF THE INVENTION

This invention relates generally to a device for cleaning the magnetic read/write head of a computer floppy disk drive.

Many computers utilize well known floppy disks as low-cost storage media. They are flexible sheaths that house a thin, flexible magnetic material. When properly placed in a computer disk drive and clamped in place, a central hub that extends through a central hub receiving opening in the shaft grips the magnetic disk to rotate the disk. A head in the drive mechanism moves along a window or head receiving aperture in the sheath and rides on the rotating disk. The computer moves the head radially in and out along the window, and the disk rotates. Therefore, the head can reach every usable portion of the disk. This of course is conventional.

As with any head that makes contact with a magnetic medium, whether it be audio or video tape or a computer floppy disk, there is friction between the head and the magnetic material. This action causes a slight removal of magnetic material or oxide from the magnetic medium, and the magnetic material builds up on the head. As the build up becomes too severe, read and write errors may occur. Moreover, as material builds up on the head, the head increases its coefficient of friction, and the wear process increases.

Therefore, it is important to remove any built up oxide or other magnetic material from the heads. One method—perhaps the simplest—required the user to wipe the heads with a cotton swab dipped in alcohol or other solvent. Although this is a standard method for cleaning audio tape recorder heads, the heads are much less accessible on a floppy disk drive, and this method is not practical.

Another method of cleaning a head involved the use of a dry, mildly abrasive material. For example, an audio cassette is wound with a relatively short length of a mildly abrasive type. This is run through the tape recorder a number of times so that the abrasive tape travels over the head and removes the oxide. Some audio tape manufacturers build in a short leader of abrasive material for cleaning the head each time the tape is played. Unfortunately, abrasive material is ultimately detrimental to the head. Although magnetic heads are made of very hard, wear resistant materials, use of a material sufficiently abrasive to remove oxides is incompatible with long head life. Even where the dry cleaner is not abrasive but uses a material that tends to dislodge the oxide and pull it off, the dry cleaning action is not completely effective in removing oxide. Consequently, the most difficult oxide to be removed is never removed, and the head continually stays dirty.

To utilize through the wet cleaning action of a solvent-dipped swab with the convenience of an automatic cleaner that is inserted into a position for cleaning the head, tape head cleaners have been developed. See e.g. Kara, U.S. Pat. No. 4,141,053 (1979). For an audio cassette tape recorder, for example, a solvent such as isoprophyl alcohol is applied to an absorbent roller. When the cassette is inserted into the tape recorder, the absorbent roller is in contact with the head, and the tape recorder drive mechanism causes the roller to rotate. The solvent dissolves the oxide on the head, and the rotating absorbent material removes the oxide. It has been found that the alternating wet and dry areas in more effective in oxide removal. Other systems have been developed for video tape recorders (See e.g. application Ser. No. 325,923 (1981) of Kara) and for computer floppy disk drives.

In Sugisakim U.S. Pat. No. 4,065,798 (1977), the standard outer sheath of a floppy disk is used, but a round flat piece of fabric is inserted in the sheath. Rotating the fabric, which will contact the head, removes oxide from the head. A solvent can be applied to the fabric to dissolve the built-up oxide and the oxide is removed from the head by the fabric rotating passed it. Masuyama, U.S. Pat. No. 4,106,067 (1978) describes the use of solvents.

There are a number of problems with this system. First, there may be an insufficient area for applying solvent to the fabric. As previously mentioned, it is desirable to have both a wet and dry area. The wet area applies the solvent to the oxide, and most of the oxide will be removed in the dry area. Existing floppy disk head cleaners utilize standard sheaths with narrow windows through which the head can contact the magnetic material. The window does not have to be wide on a floppy disk; the head does not move laterally.

In a typical floppy disk drive, the floppy disk can only be inserted properly into the disk drive in one orientation. Thus, the operator must be at least skilled enough to known how to insert the floppy disk properly. If the disk is not inserted properly, the system will not operate. Therefore, the operator gets instant feedback if he or she incorrectly inserts the floppy disks and attempts to use it. With a head cleaner, however, the computer will not tell the operator that the cleaner is incorrectly inserted.

SUMMARY OF THE INVENTION

It is an object of the present invention to overcome some of the problems existing in the prior art. For example, one of the objects of the present invention is to construct a floppy disk head cleaner that allows the solvent to applied to a greater area of the absorbent material. Another object is to design and disclose a head cleaner that can be inserted in almost any likely orientation and still function properly. Other objects will become evident in the remainder of this specification.

To summarize, the head cleaner of the present invention has been improved by having additional head receiving apertures or windows through the sheath. Like the main aperture on a standard floppy disk that is about a line from the center of the hub receiving opening of the sheath perpendicular of the edge of the sheath, in the exemplary form, each of these lines has a head receiving aperture so that there are four on one side of the sheath. There is also four head receiving apertures through the other side of the sheath to provide four additional openings. Therefore, the sheath can be inserted any of eigth orientations, and the head cleaner will still operate properly.

To increase the area at which the solvent is applied to the absorbent material, the windows are head receiving apertures are wider than the standard head receiving apertures in a floppy disk.

Some disk drives have opposed head for contact with both sides of the disk. One object of the present invention is to be able to clean both heads simultaneously.

BRIEF DESCRIPTION OF THE DRAWINGS

There is one drawing FIGURE. It shows the head cleaning apparatus of the present invention in plane view, partially cut away.

DETAILED DESCRIPTION OF THE PREFERRED EMBODIMENT

Referring to the FIGURE, the head cleaner of the present invention comprises a generally flat, rectangular sheath 10 that comprises flexible bottom walls 11 and 12 respectively. These sheaths are well known as is their construction. Both the top and bottom walls 11 and 12 have a central hub receiving opening 14 through which hub 31 of the disk drive extends.

A generally flat, absorbent member 17 are received between the top and bottom walls 11 and 12 of the sheath 10. The absorbent member in the exemplary embodiment is a non-abrasive material such as a felt or soft fabric. The material must be strong enough so that the head will not rip it, and it must absorb solvents. A backing sheet may be provided to support the fabric. The absorbent material also has a central opening 18, which is located in the hub receiving opening 14. When the door of the computer drive (not shown) is closed, a member clamps the absorbent member at its opening 18 to the hub 31. Rotation of the hub therefore rotates the absorbent member 17. The sheath 10, however, is held in place in the drive housing. The inside of the sheath may be lubricated and/or formed of a low-friction material.

Normally, the sheath 10 is inserted in the direction of the arrow 32, where it will be located against a back wall (not shown) by the disk drive housing. Locator cutouts 20 and 21 help position the disk laterally in the housing.

When the door to the drive is closed, arm 33 moves head 34 downward into head receiving aperture 22, which extends through the top wall 11 so that head 34 contacts absorbent member 17. As is standard, head receiving aperture or window 22 is located about a line extending from the center of the hub perpendicular to edge 26 of the sheath 10.

It will be noted that window 22 is substantially wider than the typical window on a regular floppy disk. Whereas typically, the width of the window is between 6% and 10% of the width of the sheath, the width of the window of the present invention is greater than 10% of the width of the sheath. For example, in a nominal 5" disk such as the one shown in the figure, the window in a typical floppy disk would be approximately ½" wide. The present invention expands the window to approximately 1" wide at its greatest width. The window could even be made wider.

When the solvent is applied to the absorbent material through the large window, it can be applied to a much larger area. Obviously, the absorbancy of the material will tend to spread the solvent slightly. The wider window, however, assures that the solvent is applied to a larger area.

For even greater area in which to apply solvent and to allow the head to be inserted in a different orientation from its normal one, at least one second hub receiving aperture means apart from the first aperture 22 and extending through top wall 11 and also about a line perpendicular from the edge of the sheath to the center of the hub is provided. In the exemplary embodiment, four such hub receiving apertures 23, 24 and 25 are provided. By use of four windows 22-25, sheath 10 can be inserted with any edge 26 or any other edge against the back wall of the housing. Therefore, the sheath 10 can be inserted in any four orientations, and the arm 33 will still place the head 34 against the absorbent member 17 through one of the windows. In this way, the amount and placement of the solvent can be controlled. With four possible orientations, the user does not have to check to insure that the sheath 10 is being inserted properly on the disk drive.

For even greater ease of insertion and for simultaneous cleaning of a second head, an additional number of head receiving apertures may be through bottom wall 12. In the FIGURE, only one window 27 through bottom wall 12 is shown. Preferably, there will be four apertures through the bottom wall 12 also, and the head cleaner can be inserted in any of eight orientations. It is therefore impossible to insert the sheath 10 into the disk drive and close the door and have the sheath improperly inserted. The head will still contact the absorbent member 17 through one of the windows. Also, both the front and back surfaces of the absorbent member can be used.

One or more of the apertures on either the top or bottom walls 11 or 12 can be covered with a patch such as patch 38, which covers aperture 23 if the aperture is not being used.

Rather than a single sensing hole 39 near the central aperture, the present apparatus has a plurality of sensing holes 39. Normally, a sensor over hole 39A senses the proper insertion and rotation of the diskette. The additional holes 39 allow the sensor the operate when the diskette is inserted in any of the light orientations.

It is not important that if the solvent is applied to the absorbent member through only one of the windows that it be that window that will be positioned below the head. Rotation of the absorbent member will rotate the wet portion of the absorbent member over the head. Thus, the system is practically fool proof.

Although many solvents may be used, isopropyl alcohol or a mixture of isopropyl alcohol with Freon DE flurocarbon is the preferred solvent.

The foregoing description was of the exemplary embodiment only. It is recognized that changes could be made within the scope of the present invention that are the equivalent of the structure described in the present embodiment. The invention is set forth in the claims.

I claim:

1. In a head cleaner for a disk drive comprising a generally flat, rectangular sheath having flexible top and bottom walls and four edges, a central hub receiving opening through which a hub of a disk drive can extend, a generally flat, absorbent member received within the sheath and having a central opening located in the hub receiving opening of the sheath, and first head receiving aperture means through one wall of the sheath positioned about a line perpendicular from the edge of the sheath to the center of the hub receiving opening of the sheath such that it is positioned under the head of the disk drive when the head cleaning apparatus is in the disk drive, the improvement comprising the provision:

three other head receiving aperture means apart from the first head receiving aperture means through the one wall of the sheath, the first head receiving aperture means and the three other head receiving aperture means being on the four lines perpendicular from the center of the hub to the four edges of the sheath for permitting contact of the absorbent member by the head through the first and the three other head receiving aperture means irrespective of which edge of the sheath is inserted into the disk drive.

2. In the head cleaner of claim 1, the improvement further comprising four secondary apertures through the other wall of the sheath and aligned with the first and the three other head receiving aperture means through the first wall of the sheath.

3. In the head cleaner of claim 1, the improvement further comprising the provision of each of the head receiving aperture means having a maximum width of at least 10% of the width of the sheath.

4. In the head cleaner of claim 1, the improvement comprising a plurality of sensor holes through the sheath, at least one sensor hole being adjacent each of the head receiving aperture means and at least one hole through the absorbent member positioned under the sensor holes at at least one position during rotation of the absorbent member.

5. In the head cleaner of claim 1, the improvement further comprising at least one cut-out through each of the edges of the sheath for locating the head cleaner in the disk drive.

6. In the head cleaner of claim 5, the improvement wherein the sheath has two cut-outs equally spaced from the center of each edge of the sheath for locating the head cleaner in the disk drive irrespective of which edge is inserted into the disk drive and irrespective of which wall faces either side of the disk drive.

7. In the head cleaner of claim 1, the improvement further comprising the provision of each of the first and the three other head receiving apertures being of the same size.

* * * * *